(No Model.)
D. H. GOOD.
CONVEYER FOR THRASHING MACHINES.
No. 315,404. Patented Apr. 7, 1885.
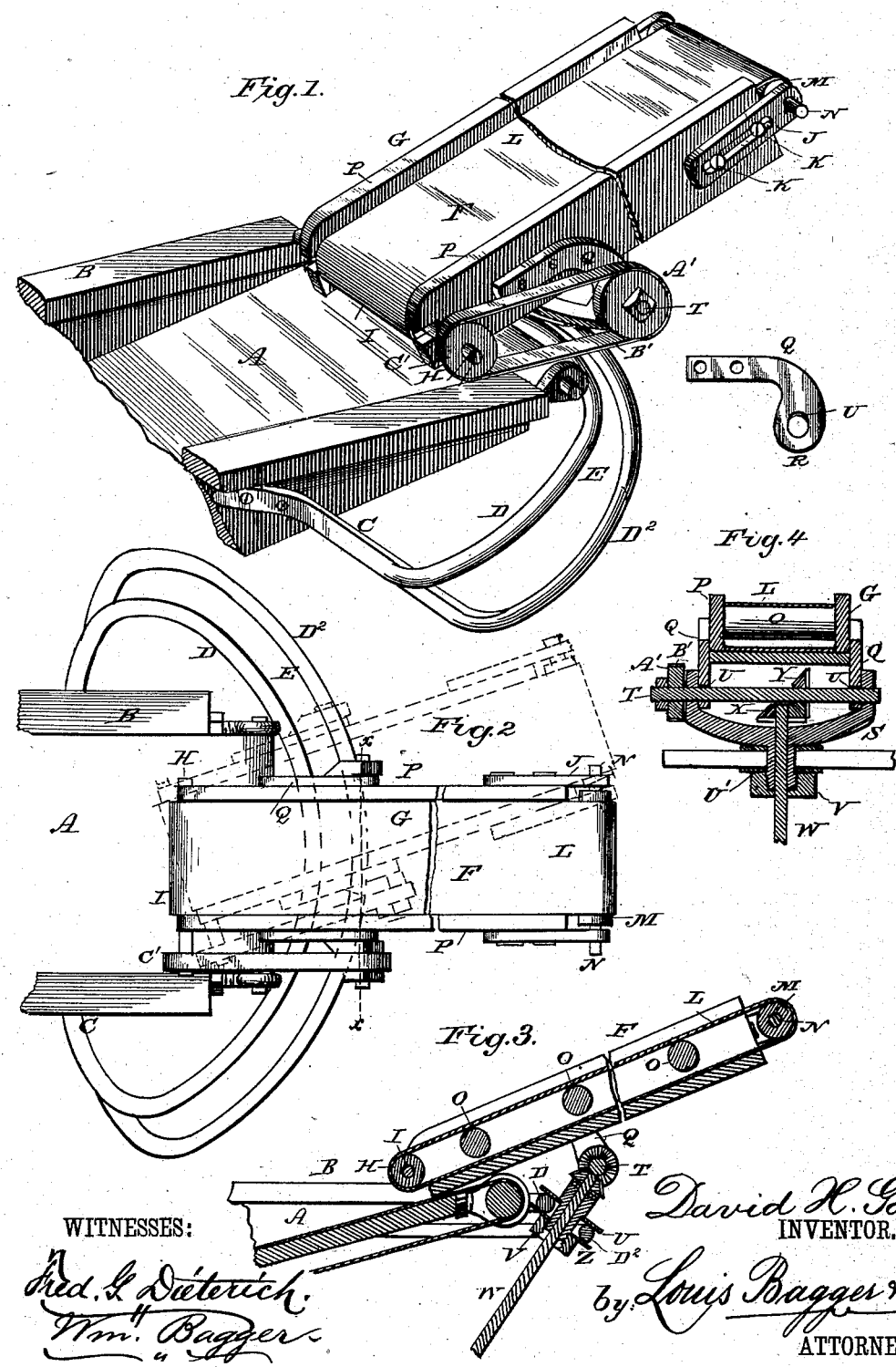
WITNESSES:
Fred. G. Dieterich.
Wm. H. Bagger.
David H. Good,
INVENTOR.
by Louis Bagger & Co.
ATTORNEYS.

UNITED STATES PATENT OFFICE.

DAVID H. GOOD, OF CANADA, KANSAS.

CONVEYER FOR THRASHING-MACHINES.

SPECIFICATION forming part of Letters Patent No. 315,404, dated April 7, 1885.

Application filed November 25, 1884. (No model.)

*To all whom it may concern:*

Be it known that I, DAVID H. GOOD, a citizen of the United States, and a resident of Canada, in the county of Marion and State of Kansas, have invented certain new and useful Improvements in Conveyers for Thrashing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my invention, showing the grain-conveyer which is the subject of the said invention in position for operation. Fig. 2 is a top or plan view with dotted lines which indicate some of the positions to which the conveyer may be adjusted. Fig. 3 is a longitudinal vertical sectional view of the conveyer in position for operation, and Fig. 4 is a transverse vertical sectional view taken on the line *x x* in Fig. 2.

The same letters refer to the same parts in all the figures.

This invention relates to an improved grain-conveyer or device for supplying grain to thrashing-machine feeders, and more especially to an improved feeder invented by me, and which forms the subject of a separate application for Letters Patent filed by me conjointly with this present application; and my invention consists in an improved construction and combination of parts, whereby a device shall be produced which shall possess superior advantages in point of simplicity, durability, and general efficiency, and which shall work equally well and efficiently whether used for conveying bound or loose grain to the feeder, or what is known as "header-stuff," and which shall, moreover, operate equally well without regard to the construction of the feeder or of the thrashing-machine to which the latter is applied, provided, however, that the said feeder shall be provided with means for attaching and adjusting the said conveyer, substantially as will be hereinafter more fully described, and particularly pointed out in the claims.

In the drawings hereto annexed, A designates the feeder, the construction of which is described and claimed in detail in another application, and which is secured in any suitable manner to the body of a thrashing-machine, B, of ordinary construction. To the sides of the said feeder are secured a pair of forwardly and downwardly extending brackets, C C, the ends of which are connected by semicircular or segmental arms D D², the outer one of which, D², is at a lower level than the inner one, so that the two together shall form an inclined track, E.

F designates the conveyer, which consists of a trough-shaped body, G, of indefinite length, the lower end of which is provided with bearings for a transverse shaft, H, on which is mounted a roller, I.

The upper ends of the sides of the body G are provided with slotted arms or brackets J J, secured adjustably by means of set-screws K K, and which may be extended, when desired, for the purpose of stretching an endless apron or carrier, L, which is mounted upon the roller I and upon a roller, M, secured on a shaft, N, which is journaled in suitable bearings in the ends of the brackets J J.

The sides of the trough or body are connected by a series of rollers, O O, journaled in the said sides, and which serve not only as braces, but also to support the upper side of the apron, and to prevent it from sagging by the weight resting thereon during operation.

The sides P P of the trough or body G are provided with hangers Q Q, the lower ends of which are segmental or rounded, so as to form shoulders R R, adapted to rest upon a yoke, S, the ends of which are provided with bearings for a transverse shaft, T, passing through oblong or elliptical openings U in the lower ends of the hangers Q. It will be seen that by this construction, while the entire weight of the conveyer-trough rests upon the said yoke, it is the rounded ends of the hangers Q that always rest upon the said yoke, thereby relieving all strain upon the shaft T, passing through the bearings in the said yoke and brackets.

The yoke S is provided with a central downwardly-extending tubular collar, U, the lower end of which is screw-threaded to receive a nut, V. This collar forms a bearing for a shaft, W, the upper end of which has a pinion, X, meshing with a pinion, Y, upon the transverse shaft T, while the lower end of the said shaft W is driven by suitable connection with a tumbling-rod extending the length of the thrashing-machine, and operated in the usual or in any suitable manner, and the rear end of which serves to drive the straw-stacker at the rear end of the machine.

The yoke S is in practice mounted upon the track E, formed by the arms D D², to which reference has been made above, by means of the tubular collar U, which is adjusted between the said arms, and secured by means of the nut V, suitable washers, Z Z, being interposed above and below.

One end of the shaft T is provided with a pulley, A', from which a belt or chain, B', runs over a pulley, C', upon the end of the upper roller-shaft, N, supporting the endless apron or carrier, to which motion is thus communicated.

From the foregoing description, taken in connection with the drawings hereto annexed, the operation and advantages of this invention will be readily understood.

The general construction of the device is simple and inexpensive, and it is therefore not liable to get out of order. It is easily managed and adjusted, so as to convey the grain from any one of a series of stacks to the feeder, and the upper or feed end, being the heaviest, is automatically lowered as the stack becomes reduced in height, while it may be readily shifted from one to another of a series of suitably-located stacks without changing the position of the machine.

It is obvious that this invention is subject to various changes with regard to the construction of details, and I would therefore have it understood that I do not limit myself to the precise construction herein shown, but reserve to myself the right to all such modifications as may be resorted to without departing from the spirit of my invention.

Having thus described my invention, I claim and desire to secure by Letters Patent of the United States—

1. In a grain-conveyer, the combination of a trough, shaft-hangers secured upon the sides of them and having rounded lower ends, an endless apron or carrier, traveling upon suitable rollers, one of which is a drive-pulley therefor, a yoke, a transverse shaft extending through the said yoke, and oblong openings in the lower ends of the said hangers, which are thereby caused to rest upon the yoke without strain upon the shaft, a segmental track, a tubular collar extending downwardly from the said yoke, and a shaft having its bearings in said collar and gearing with the transverse shaft, and conveying motion to the latter, substantially as and for the purpose set forth.

2. The combination, with a feed-chute and frame of a thrashing-machine and a segmental track suitably attached thereto and composing a pair of semicircular arms the outer one of which is lower than the inner one, of a conveyer and a supporting-yoke provided with a downwardly-extending tubular collar screw-threaded at its lower end, and having washers and a nut, whereby it is mounted adjustably upon the said track, substantially in the manner and for the purpose set forth.

3. In a conveyer for thrashing-machine feeders, the combination of the machine-frame, the double segmental track, the yoke laterally adjustable thereon, and the conveyer-frame mounted upon said yoke, as and for the purpose shown and set forth.

In testimony that I claim the foregoing as my own I have hereunto affixed my signature in presence of two witnesses.

DAVID H. GOOD.

Witnesses:
WM. BAGGER,
CHAS. PHILIPBAR.